US009811371B2

(12) United States Patent
Nachum et al.

(10) Patent No.: US 9,811,371 B2
(45) Date of Patent: Nov. 7, 2017

(54) CONCURRENT EXECUTION OF A COMPUTER SOFTWARE APPLICATION ALONG MULTIPLE DECISION PATHS

(75) Inventors: Gili Nachum, Rehovot (IL); Vladimir Gamaley, Rehovot (IL); Gil Perzy, Rehovot (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 661 days.

(21) Appl. No.: 13/537,764

(22) Filed: Jun. 29, 2012

(65) Prior Publication Data

US 2014/0007103 A1 Jan. 2, 2014

(51) Int. Cl.
*G06F 9/46* (2006.01)
*G06F 9/48* (2006.01)
*G06F 9/445* (2006.01)

(52) U.S. Cl.
CPC .............. *G06F 9/46* (2013.01); *G06F 9/4843* (2013.01); *G06F 8/60* (2013.01); *G06F 8/61* (2013.01)

(58) Field of Classification Search
None
See application file for complete search history.

(56) References Cited

U.S. PATENT DOCUMENTS

| | | | |
|---|---|---|---|
| 6,208,996 B1 * | 3/2001 | Ben-Shachar et al. | |
| 6,598,225 B1 * | 7/2003 | Curtis | G06F 8/61 717/108 |
| 6,918,112 B2 * | 7/2005 | Bourke-Dunphy | G06F 8/61 717/177 |
| 7,171,661 B1 * | 1/2007 | Pinera et al. | 717/172 |
| 7,355,988 B1 * | 4/2008 | Denbar et al. | 370/282 |
| 7,457,722 B1 * | 11/2008 | Shain et al. | 702/182 |
| 8,631,406 B2 * | 1/2014 | Driesen et al. | 718/1 |
| 8,739,186 B2 * | 5/2014 | Iorio | G06F 9/485 709/208 |
| 8,966,507 B2 * | 2/2015 | Tanaka | G06F 8/60 719/328 |
| 9,009,734 B2 * | 4/2015 | Iorio | G06F 9/466 712/207 |
| 9,021,466 B2 * | 4/2015 | You | G06F 9/4446 717/174 |
| 9,342,606 B2 * | 5/2016 | Baldwin | G06F 8/61 |
| 2002/0010910 A1 * | 1/2002 | Crudele | G06F 8/61 717/128 |

(Continued)

OTHER PUBLICATIONS

Tuck et al. "Multithreaded Value Prediction", Proceedings of the 11th int'l Symposium on HPCA, 2005 IEEE, (Tuck_2005.pdf, pp. 1-11).*

(Continued)

*Primary Examiner* — Hiren Patel
(74) *Attorney, Agent, or Firm* — Cuenot, Forsythe & Kim, LLC

(57) ABSTRACT

Managing the execution of a computer software application by duplicating a primary instance of a computer software application during its execution in a primary execution context to create multiple duplicate instances of the computer software application in corresponding duplicate execution contexts, and effecting a selection of a different candidate subset of predefined elements for each of the duplicate instances.

10 Claims, 7 Drawing Sheets

(56) References Cited

U.S. PATENT DOCUMENTS

| | | | |
|---|---|---|---|
| 2002/0133814 A1* | 9/2002 | Bourke-Dunphy | G06F 8/61 717/174 |
| 2007/0044073 A1* | 2/2007 | Kornerup et al. | 717/113 |
| 2007/0169114 A1* | 7/2007 | Birk Olsen | G06F 8/61 717/174 |
| 2008/0126974 A1* | 5/2008 | Fawcett | G06F 8/61 715/772 |
| 2008/0163210 A1* | 7/2008 | Bowman et al. | 718/1 |
| 2008/0295114 A1* | 11/2008 | Argade et al. | 719/320 |
| 2009/0037885 A1* | 2/2009 | Edwards et al. | 717/128 |
| 2009/0150482 A1* | 6/2009 | Markisohn | G06F 8/63 709/203 |
| 2009/0150885 A1 | 6/2009 | Safari et al. | |
| 2009/0193412 A1* | 7/2009 | Sugiura | G06F 3/04895 717/174 |
| 2009/0210873 A1* | 8/2009 | Cuomo et al. | 718/1 |
| 2009/0300605 A1 | 12/2009 | Edwards et al. | |
| 2010/0011352 A1* | 1/2010 | Chu | G06F 9/44526 717/174 |
| 2010/0011379 A1* | 1/2010 | Xu | G06F 9/4411 719/327 |
| 2010/0083244 A1* | 4/2010 | Bothwell | G06F 8/61 717/174 |
| 2010/0208294 A1* | 8/2010 | Nishikawa | G06F 3/1207 358/1.15 |
| 2011/0041124 A1* | 2/2011 | Fishman | G06F 8/63 717/170 |
| 2012/0144387 A1* | 6/2012 | Yuan | H04L 69/162 717/176 |
| 2012/0159478 A1* | 6/2012 | Spradlin et al. | 718/1 |
| 2012/0266156 A1* | 10/2012 | Spivak | G06F 9/5055 717/172 |
| 2013/0024853 A1* | 1/2013 | You | G06F 9/4446 717/174 |
| 2013/0111501 A1* | 5/2013 | Iorio | 719/318 |
| 2013/0344896 A1* | 12/2013 | Kirmse | G06F 17/3087 455/456.3 |
| 2014/0007107 A1 | 1/2014 | Nachum et al. | |

OTHER PUBLICATIONS

U.S. Appl. No. 13/910,464, Non-Final Office Action, Jul. 24, 2014, 24 pg.

* cited by examiner

CONCURRENT EXECUTION OF A COMPUTER SOFTWARE APPLICATION ALONG MULTIPLE DECISION PATHS

FIELD OF THE INVENTION

The present invention relates to managing the execution of a computer software application in general.

BACKGROUND OF THE INVENTION

During the execution of a computer software application a point may be reached where the application presents a set of options, such as where a computer user is meant to select one of the options, whereupon execution of the application is meant to continue along one of several paths depending on which option is selected. Often, when an application presents such options to a computer user for selection, the user might not know what selection to make, thus delaying execution of the application until a selection is made. Such execution delays are often costly, and therefore undesirable.

SUMMARY OF THE INVENTION

In one aspect of the invention a method is provided for managing the execution of a computer software application, the method including duplicating a primary instance of a computer software application during its execution in a primary execution context, thereby creating multiple duplicate instances of the computer software application in corresponding duplicate execution contexts, and effecting a selection of a different candidate subset of predefined elements for each of the duplicate instances.

In other aspects of the invention systems and computer program products embodying the invention are provided.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
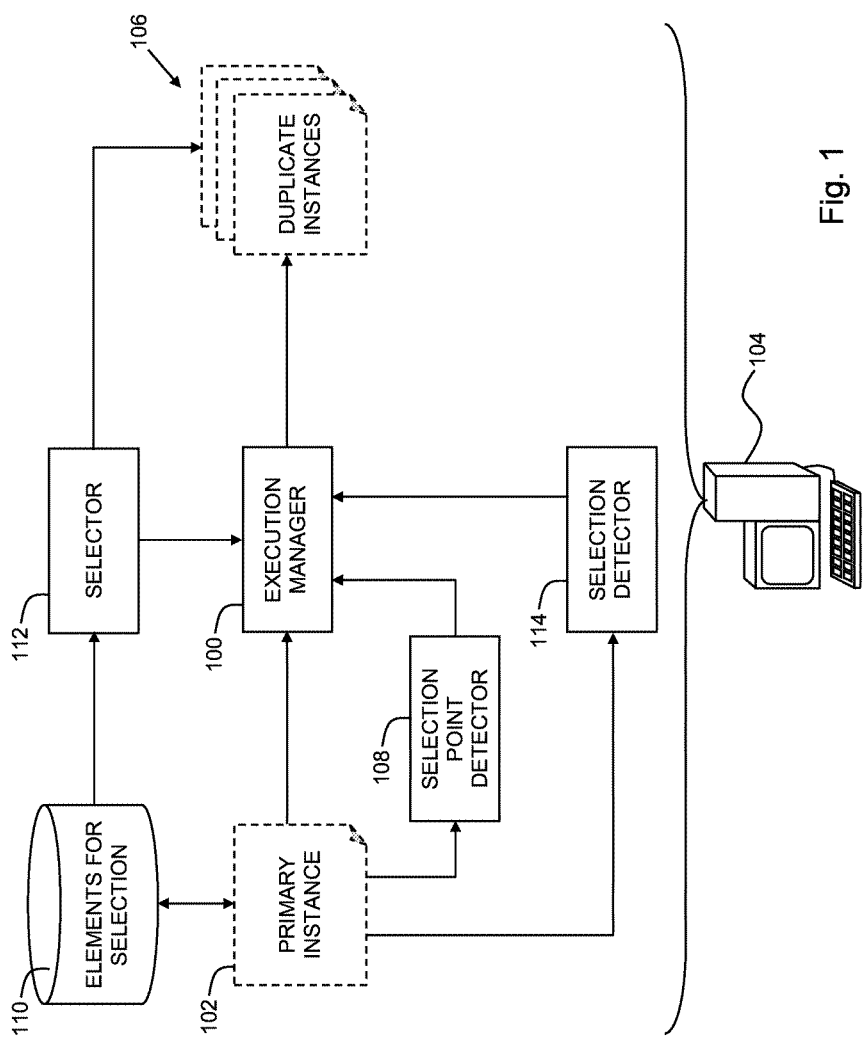
FIG. 1 is a simplified conceptual illustration of a system for concurrent execution of a computer software application along multiple decision paths, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for concurrent execution of a computer software application along multiple decision paths, constructed and operative in accordance with an embodiment of the invention. In the system of FIG. 1, an execution manager 100 is configured to duplicate a primary instance 102 of a computer software application during its execution in a primary execution context on a computer 104, thereby creating any number of duplicate instances 106 of the computer software application, where the duplicate instances 106 are preferably executed in parallel in a corresponding number of duplicate execution contexts on computer 104 or one or more other computers (not shown).

A selection point detector 108 is configured to detect when primary instance 102 requests that primary instance 102 be duplicated, such as when primary instance 102 reaches a point during its execution where it presents a set 110 of predefined elements, such as buttons representing various options, where a computer user is meant to select one of the options, whereupon execution of primary instance 102 is meant to continue along one of several paths depending on which option is selected. Execution manager 100 is preferably configured to duplicate primary instance 102 in response to selection point detector 108 detecting the request by primary instance 102. Additionally or alternatively, selection point detector 108 is configured to detect when primary instance 102 otherwise provides an indication that a selection be made of any of the predefined elements in set 110, where execution manager 100 is configured to duplicate primary instance 102 in response to selection point detector 108 detecting the indication.

A selector 112 is configured to effect a selection of a different candidate subset of the predefined elements in set 110 for each of the duplicate instances 106. Continuing with the previous example where primary instance 102 presents various options for selection, selector 112 preferably selects a different option for each of the duplicate instances 106, such that each of the duplicate instances 106 continues its execution based on the selection of a different one of the options.

A selection detector 114 is configured to detect when a selection of a primary subset of set 110 of the predefined elements is made for primary instance 102. Execution manager 100 is preferably configured to determine, in response to the primary subset selection being made, whether any of the duplicate instances 106 is currently being executed whose candidate subset is identical to the primary subset. Execution manager 100 is preferably configured to terminate primary instance 102 and any, and preferably all, of the duplicate instances 106 whose candidate subset of the predefined elements in set 110 differs from the primary subset. Preferably, only one of the duplicate instances 106 is maintained in an execution context, one whose candidate subset of the predefined elements in set 110 is identical to the primary subset selected for primary instance 102. Execution manager 100 preferably provides a notification if no such duplicate instance 106 is found, and/or terminates any, and preferably all, of the duplicate instances 106.

Additionally or alternatively, selection detector 114 is configured to detect when a selection is made of any of the instances of the computer software application, including duplicate instances 106 and optionally including primary instance 102 as well, where execution manager 100 is configured to terminate any, and preferably all, of the instances excluded from the selection.

Additionally or alternatively, primary instance 102 and/or any of the duplicate instances 106 may be configured to self-terminate if the instance determines that any other of the instances meets a predefined condition. For example, if one of the duplicate instances 106 successfully completes a particular task, and primary instance 102 and the other duplicate instances 106 are able to determine this using any conventional technique, such as where the successful duplicate instance 106 is able to directly or indirectly notify the other instances using a publication/subscription system, the other instances may self-terminate, leaving only the successful instance to continue its execution.

It is appreciated that any duplicate instance may itself be duplicated as described herein in the same manner as primary instance 102 is duplicated, such as when it, too, reaches a point during its execution where it presents a set of predefined elements for selection. Thus, a primary instance may spawn duplicate instances which in turn spawn duplicate instances and so on, preferably to a user-defined limit, such as to a predefined generation depth or maximum number of instances. Each duplicate instance of any generation may be managed with respect to its "parent" instance as primary instance 102 and its duplicate instances 106 are managed as described herein.

Any of the elements shown in FIG. 1 are preferably implemented by one or more computers, such as computer 104, in computer hardware and/or in computer software embodied in a non-transitory, computer-readable medium in accordance with conventional techniques.

Figure 2A:
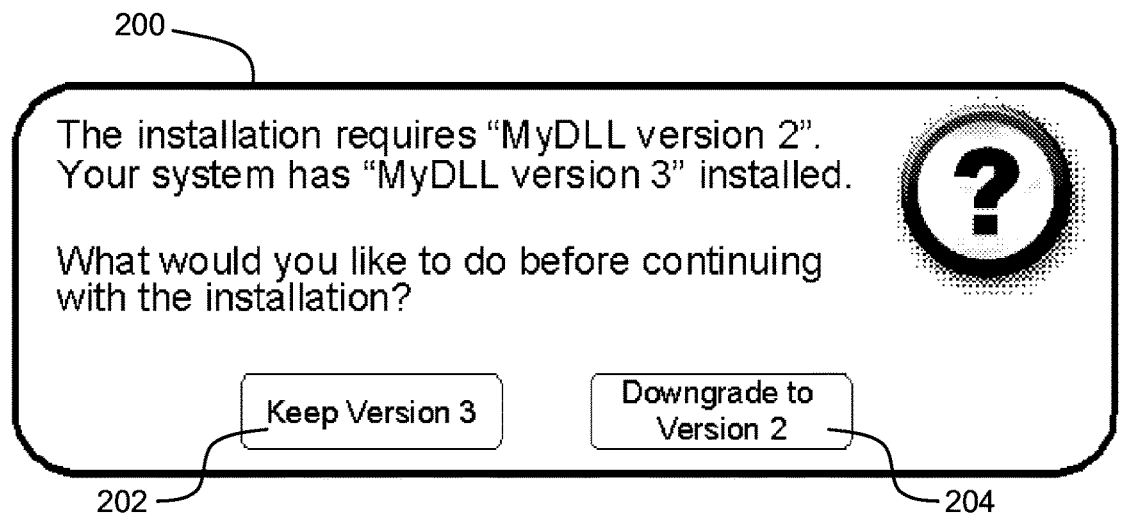
FIGS. 2A-2D are simplified conceptual illustrations of various aspects of the operation of the system of FIG. 1 with respect to an exemplary scenario, operative in accordance with an embodiment of the invention.
Figure 2B:
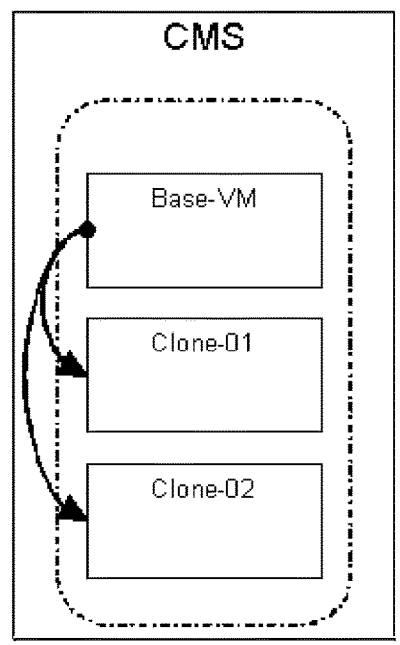
Figure 2C:
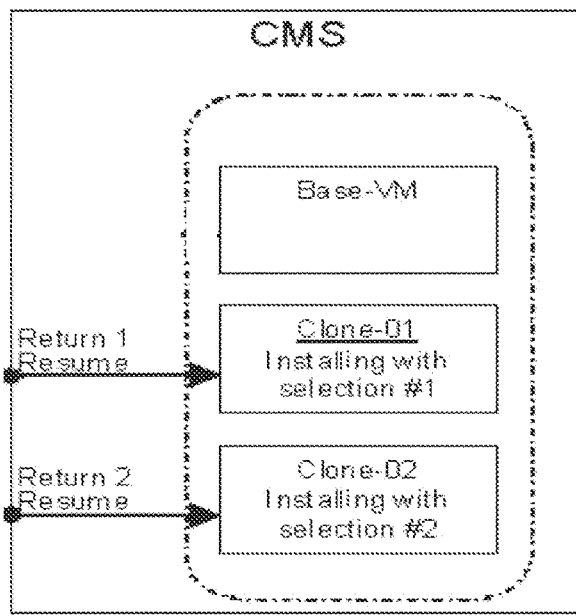

Reference is now made to FIGS. 2A-2D, which illustrate, in the context of an exemplary scenario, various aspects of the operation of the system of FIG. 1, operative in accordance with embodiments of the invention. FIG. 2A shows a dialog 200 of a primary instance of an installation program during its execution, where at a certain point during its execution the installation program asks a user to select one of two options 202 and 204. In the example shown, the installation program is executed inside a virtual machine (VM) that is managed by a hypervisor, which is itself managed by an execution manager that is referred to herein as a Cloud Management System (CMS). Upon presenting the options to the user the installation program within the VM, now referred to as the Base-VM, provides the options to the CMS and asks the CMS to duplicate or "fork" the Base-VM by cloning the Base-VM, including the currently-executed installation program and the Base-VM internal state information, into a different clone VM, now referred to as Clone-01 and Clone-02, for each one of the options. FIG. 2B shows the CMS, the Base-VM, Clone-01, and Clone-02 immediately after the forking is completed, where the states of Clone-01 and Clone-02 are identical to the state of Base-VM. Clone-01 and Clone-02 then ask the CMS to provide selected options for execution. Thus, in the example shown, the CMS selects and returns one option to Clone-01 and selects and returns the other option to Clone-02 as is shown in FIG. 2C. The installation program in Clone-01 then continues its execution using the option selected for it, while the installation program in Clone-02 continues its execution using the option selected for it.

Figure 2D:
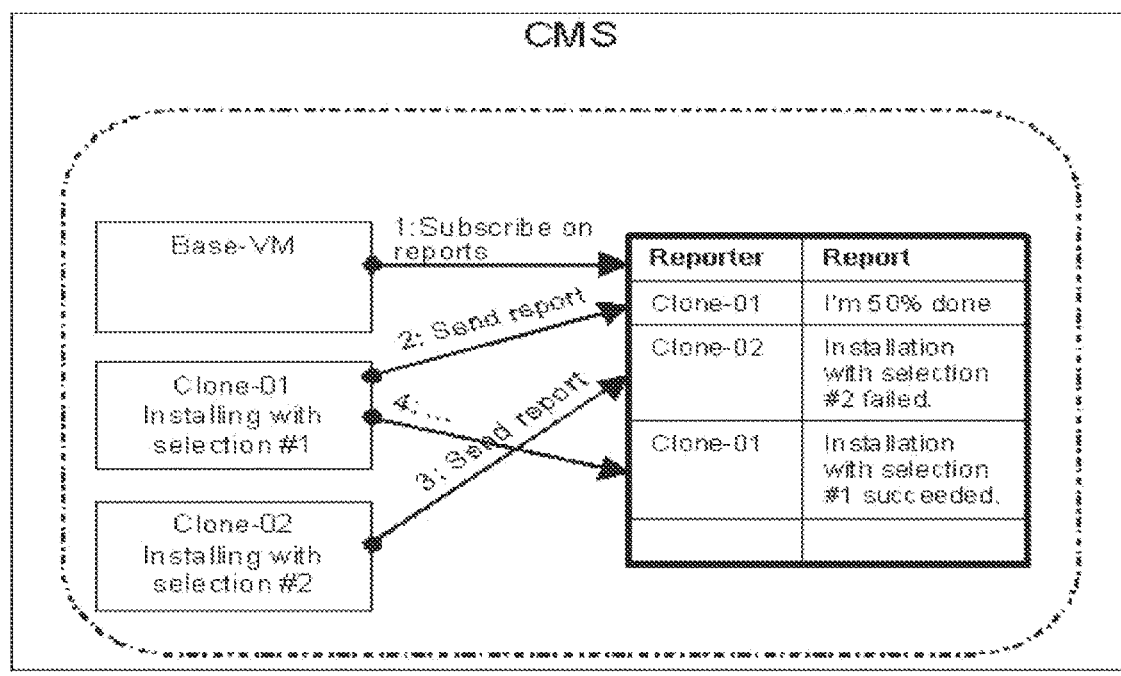

FIG. 2D shows the installation programs within the VMs providing status notifications relating to their execution progress. Thus, when Clone-01 reports its installation progress as being 50% complete, the Base-VM may use this information to notify a user regarding the progress of the installation. When Clone-02 reports that its installation attempt ended in failure (i.e., it is configured to make this determination) and Clone-01 reports that its installation attempt ended in success, the Base-VM may use this information to notify a user that the selection of option #1 is recommended, and/or the CMS may automatically terminate Clone-02 as well as Base-VM itself, whereupon the user may continue to work only with Clone-01. In this manner, execution of the installation program may continue even if a user never selects either of options 202 and 204 (FIG. 2A). However, should a user select an option at any time during the execution of the installation program in the clone VMs, and a clone VM exists that corresponds to the selected option, the CMS may terminate the Base-VM and all other clone VMs, whereupon the user may continue to work only with the clone VM that corresponds to the selected option.

Figure 3:
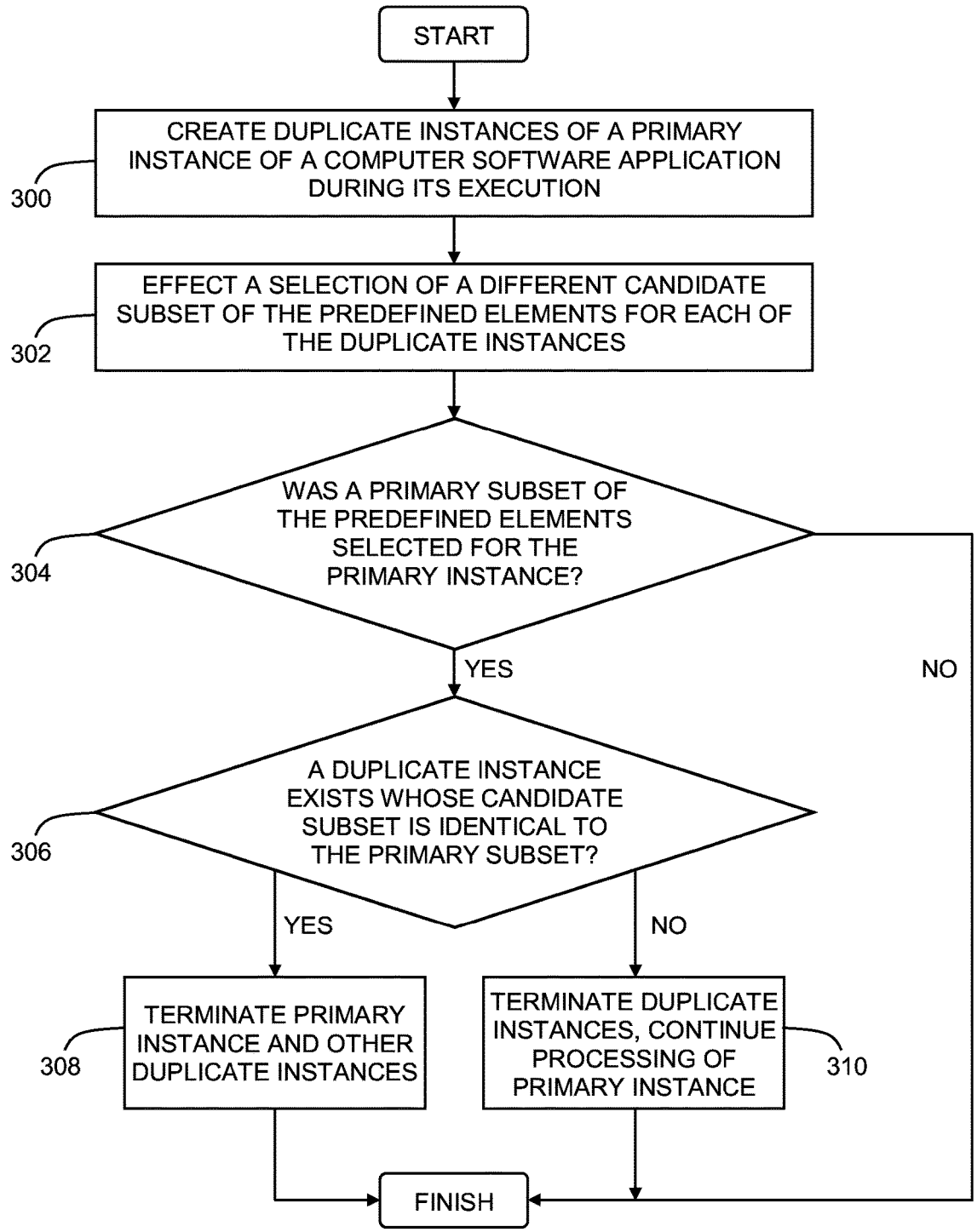
FIG. 3 is a simplified flowchart illustration of an exemplary method of operation of the system of FIG. 1, operative in accordance with an embodiment of the invention.

Reference is now made to FIG. 3, which is a simplified flowchart illustration of an exemplary method of operation of the system of FIG. 1, operative in accordance with an embodiment of the invention. In the method of FIG. 3, duplicate instances are made of a primary instance of a computer software application during its execution (step 300), such as when the primary instance reaches a point during its execution where it presents a set of predefined elements for selection, whereupon execution of the primary instance is meant to continue along one of several paths depending on which of the predefined elements is selected. A selection of a different candidate subset of the predefined elements is effected for each of the duplicate instances (step 302), such that each of the duplicate instances continues its execution based on the candidate subset selected for it. If a selection of a primary subset of the predefined elements is made for the primary instance (step 304), and a duplicate instance exists whose candidate subset is identical to the primary subset (step 306), then the primary instance and any, and preferably all, of the duplicate instances whose candidate subset differs from the primary subset are terminated (step 308). If no duplicate instance exists whose candidate subset is identical to the primary subset, any, and preferably all, of the duplicate instances are terminated and processing of the primary instance continues (step 310).

Figure 4:
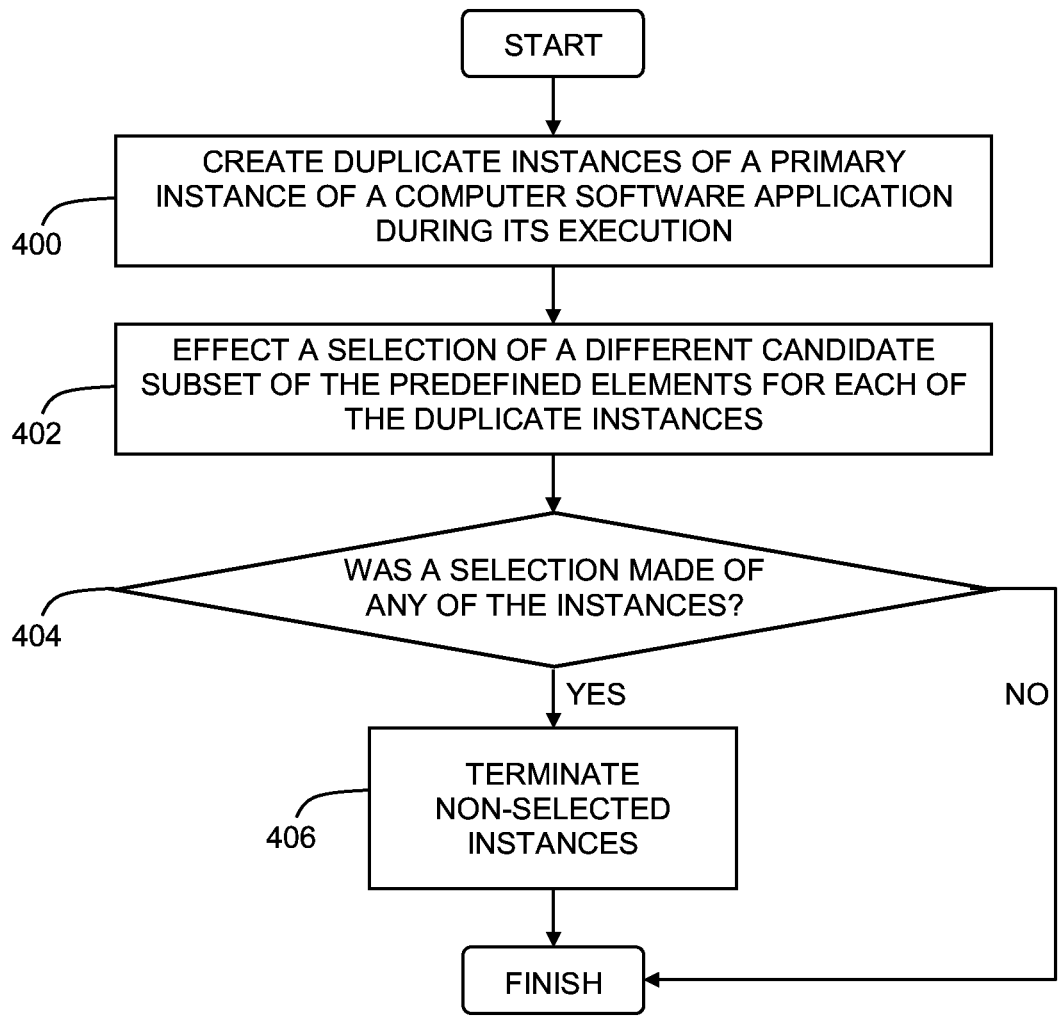
FIG. 4 is a simplified flowchart illustration of an exemplary method of operation of the system of FIG. 1, operative in accordance with an embodiment of the invention.

Reference is now made to FIG. 4, which is a simplified flowchart illustration of an exemplary method of operation of the system of FIG. 1, operative in accordance with an embodiment of the invention. In the method of FIG. 4, duplicate instances are made of a primary instance of a computer software application during its execution (step 400), such as when the primary instance reaches a point during its execution where it presents a set of predefined elements for selection, whereupon execution of the primary instance is meant to continue along one of several paths depending on which of the predefined elements is selected. A selection of a different candidate subset of the predefined elements is effected for each of the duplicate instances (step 402), such that each of the duplicate instances continues its execution based on the candidate subset selected for it. If a selection is made of any of the instances (step 404), then any, and preferably all, of the non-selected instances are terminated (step 406).

Figure 5:
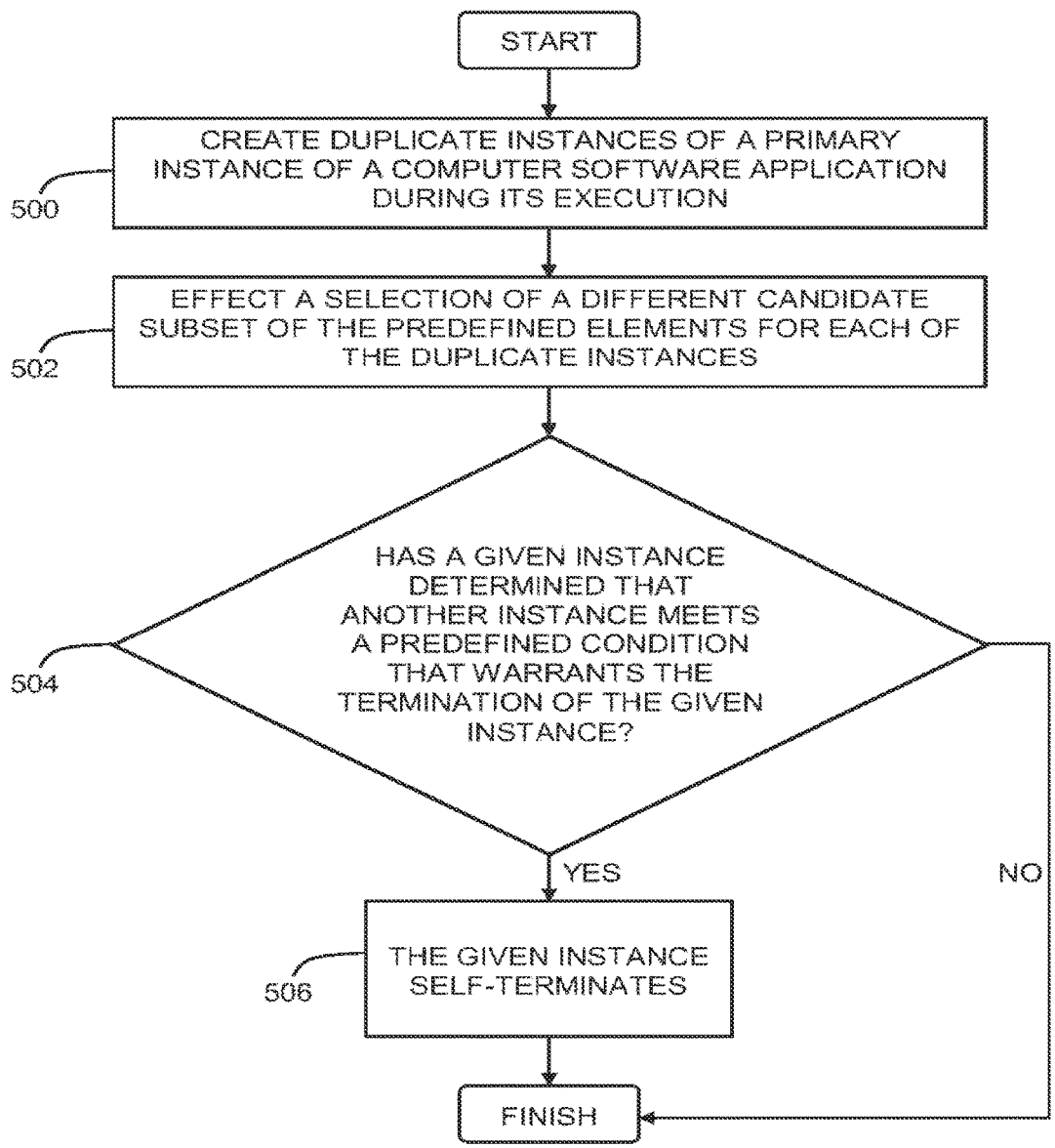
FIG. 5 is a simplified flowchart illustration of an exemplary method of operation of the system of FIG. 1, operative in accordance with an embodiment of the invention.

Reference is now made to FIG. 5, which is a simplified flowchart illustration of an exemplary method of operation of the system of FIG. 1, operative in accordance with an embodiment of the invention. In the method of FIG. 5, duplicate instances are made of a primary instance of a computer software application during its execution (step 500), such as when the primary instance reaches a point during its execution where it presents a set of predefined elements for selection, whereupon execution of the primary instance is meant to continue along one of several paths depending on which of the predefined elements is selected. A selection of a different candidate subset of the predefined elements is effected for each of the duplicate instances (step 502), such that each of the duplicate instances continues its execution based on the candidate subset selected for it. If any given instance determines that any other of the instances meets a predefined condition that warrants the termination of the given instance (step 504), the given instance may self-terminate (step 506). Additionally or alternatively, if any given instance determines that it meets a predefined condition that warrants the termination of the other instances, such as when the given instance successfully reaches a specified point in its execution, the given instance may instruct or otherwise cause the other instances to self-terminate or be terminated, or may provide a notification that the predefined condition is met, whereupon the user may continue to work only with the successful instance.

Figure 6:
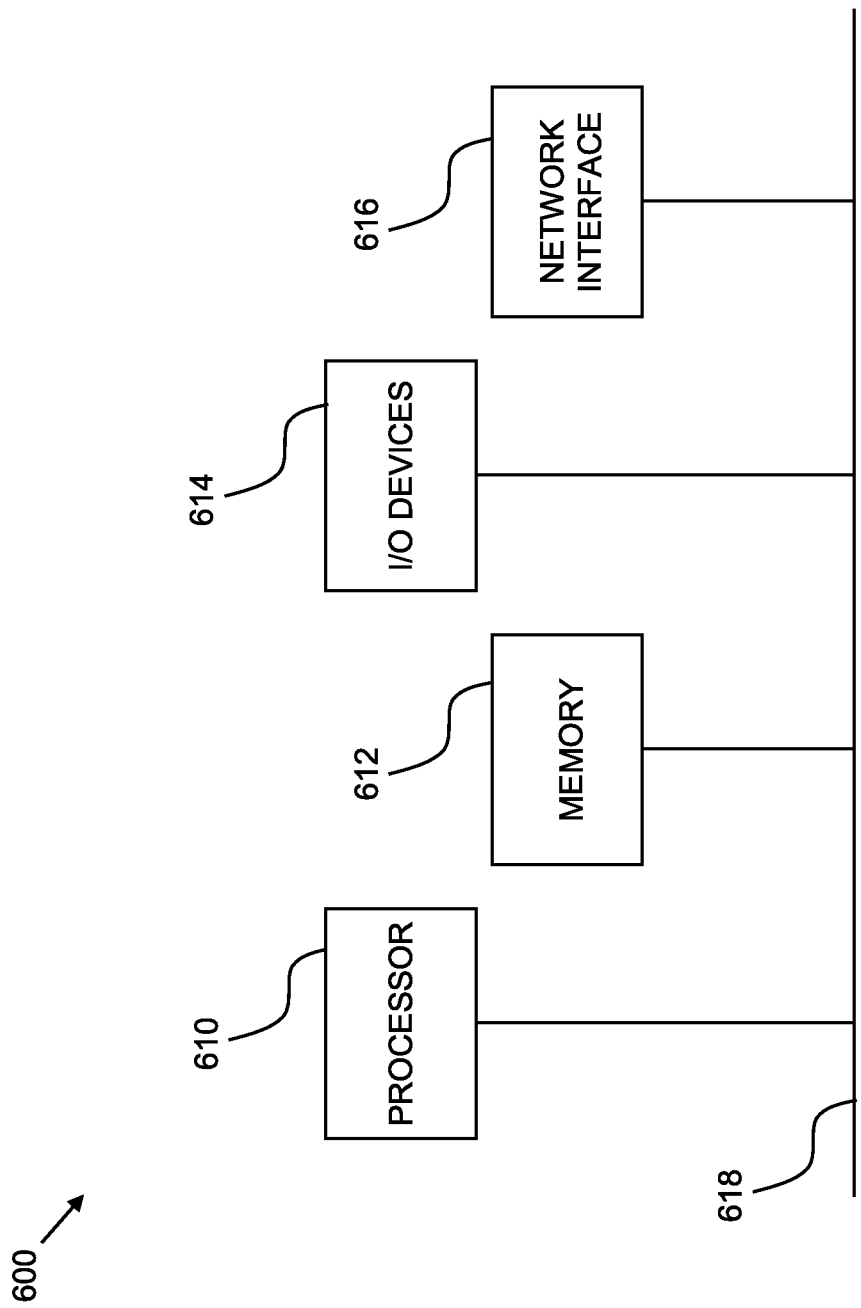
FIG. 6 is a simplified block diagram illustration of an exemplary hardware implementation of a computing system, constructed and operative in accordance with an embodiment of the invention.

Referring now to FIG. 6, block diagram 600 illustrates an exemplary hardware implementation of a computing system in accordance with which one or more components/methodologies of the invention (e.g., components/methodologies described in the context of FIGS. 1-5) may be implemented, according to an embodiment of the invention.

As shown, the techniques for controlling access to at least one resource may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer hardware system configured to manage execution of a computer software application, comprising:
   a hardware processor configured to initiate the following operations:
      identifying, during execution of a primary instance of the computer software application, the primary instance reaching an execution point that presents a plurality of predefined options to a user; wherein the computer software application is an installation program executing within a virtual machine, and each of the plurality of duplicate instances execute within respective cloned virtual machines;
      generating, prior to selection by the user of one of the pre-defined options and based upon the execution point being reached, a plurality of duplicate instances of the primary instance;
      assigning, respectively, execution paths corresponding to the plurality of predefined options to each of the plurality of duplicate instances;
      executing, prior to the selection by the user of one of the predefined options, the plurality of duplicate instances along their respective execution paths;
      gathering information associated with the execution of the each of the plurality of duplicate instances;
      automatically eliminating, as a predefined option to be presented to the user, the predefined option corresponding to one of the plurality of duplicate instances that resulted in a failed operation;
      presenting a recommendation, prior to the one predefined option being selected and based upon the gathered information, as to the plurality of pre-defined options;
      determining that one of the plurality of pre-defined options has been selected;
      terminating, based upon the one predefined option being selected, each of the duplicate instances not associated with the one predefined option; and
      identifying, within one of the execution paths corresponding to the plurality of predefined options, a second execution point that presents a second plurality of predefined option to the user, and repeating the steps of generating, assigning, and executing for the second execution path.

2. The system of claim 1, wherein the recommendation regards an installation option.

3. The system of claim 1, wherein the primary instance is terminated upon each of the duplicate instances not associated with the one predefined option being terminated.

4. The system of claim 1, wherein each of the duplicate instances not associated with the one predefined option are configured to self-terminate based upon the one predefined option being selected.

5. The system of claim 1, wherein the duplicate instance associated with the one predefined option being selected is configured to terminate each of the duplicate instances not associated with the one predefined option.

6. A computer program product, comprising:
   a computer-readable hardware storage device having computer-readable program code stored therein for managing execution of a computer software application, the computer-readable program code, which when executed by a computer hardware system, causes the computer hardware system to perform:
      identifying, during execution of a primary instance of the computer software application, the primary instance reaching an execution point that presents a plurality of predefined options to a user; wherein the computer software application is an installation program executing within a virtual machine, and each of the plurality of duplicate instances execute within respective cloned virtual machines;
      generating, prior to selection by the user of one of the pre-defined options and based upon the execution point being reached, a plurality of duplicate instances of the primary instance;

assigning, respectively, execution paths corresponding to the plurality of predefined options to each of the plurality of duplicate instances;

executing, prior to the selection by the user of one of the predefined options, the plurality of duplicate instances along their respective execution paths;

gathering information associated with the execution of the each of the plurality of duplicate instances;

automatically eliminating, as a predefined option to be presented to the user, the predefined option corresponding to one of the plurality of duplicate instances that resulted in a failed operation;

presenting a recommendation, prior to the one predefined option being selected and based upon the gathered information, as to the plurality of predefined options;

determining that one of the plurality of pre-defined options has been selected;

terminating, based upon the one predefined option being selected, each of the duplicate instances not associated with the one predefined option; and identifying, within one of the execution paths corresponding to the plurality of predefined options, a second execution point that presents a second plurality of predefined option to the user, and repeating the steps of generating, assigning, and executing for the second execution path.

7. The computer program product of claim 6, wherein the recommendation regards an installation option.

8. The computer program product of claim 6, wherein the primary instance is terminated upon each of the duplicate instances not associated with the one predefined option being terminated.

9. The computer program product of claim 6, wherein each of the duplicate instances not associated with the one predefined option are configured to self-terminate based upon the one predefined option being selected.

10. The computer program product of claim 6, wherein the duplicate instance associated with the one predefined option being selected is configured to terminate each of the duplicate instances not associated with the one predefined option.

* * * * *